(12) United States Patent
Ninomiya (10) Patent No.: US 11,554,610 B2
(45) Date of Patent: Jan. 17, 2023

(54) PNEUMATIC TIRE (71) Applicant: SUMITOMO RUBBER INDUSTRIES, LTD., Hyogo (JP)

(72) Inventor: Hiroaki Ninomiya, Kobe (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 15 days.

(21) Appl. No.: 17/195,781

(22) Filed: Mar. 9, 2021

(65) Prior Publication Data
US 2021/0283954 A1 Sep. 16, 2021

(30) Foreign Application Priority Data

Mar. 11, 2020 (JP) .............................. JP2020-042259

(51) Int. Cl.
*B60C 15/06* (2006.01)
*B60C 9/02* (2006.01)
(Continued)

(52) U.S. Cl.
CPC .............. *B60C 9/0207* (2013.01); *B60C 9/06* (2013.01); *B60C 9/07* (2013.01); *B60C 15/0018* (2013.01);
(Continued)

(58) Field of Classification Search
CPC ............ B60C 15/06; B60C 2015/0617; B60C 2015/0621; B60C 2015/0625;
(Continued)

(56) References Cited

U.S. PATENT DOCUMENTS

2006/0196591 A1* 9/2006 Yoshikawa ............. B60C 15/04
152/547
2007/0056673 A1 3/2007 Maruoka
(Continued)

FOREIGN PATENT DOCUMENTS

EP 3045327 A1 7/2016
EP 3112189 A1 1/2017
(Continued)

OTHER PUBLICATIONS

European Search Report, EPO, Application No. 21154768.2, dated May 28, 2021.

*Primary Examiner* — Cedrick S Williams
(74) *Attorney, Agent, or Firm* — Greenblum & Bernstein, P.L.C.

(57) ABSTRACT

A pneumatic tire comprises a carcass which comprises a carcass ply composed of a main portion extending between bead portions and a pair of turned-up portions turned-up around respective bead cores. The bead portion is provided with: a primary bead apex rubber disposed between the carcass-ply main portion and the carcass-ply turned-up portion; an insulation rubber layer extending radially outwardly through between the carcass-ply main portion and the carcass-ply turned-up portion; and a subsidiary bead apex rubber layer disposed on the axially outside of the carcass-ply turned-up portion. The radially outer edge of the insulation rubber layer is located radially outside the radially outer edge of the subsidiary bead apex rubber layer. The complex elastic modulus of the insulation rubber layer is equal to or greater than the complex elastic modulus of the topping rubber of the carcass ply.

19 Claims, 4 Drawing Sheets

(51) Int. Cl.
*B60C 9/06* (2006.01)
*B60C 9/07* (2006.01)
*B60C 15/00* (2006.01)
B60C 9/04 (2006.01)

(52) U.S. Cl.
CPC ...... *B60C 15/0045* (2013.01); *B60C 15/0072* (2013.01); *B60C 2009/0215* (2013.01); *B60C 2009/0491* (2013.01); *B60C 2015/009* (2013.01)

(58) Field of Classification Search
CPC ........ B60C 15/0628; B60C 2015/0639; B60C 2015/0642; B60C 2015/065; B60C 15/0603
See application file for complete search history.

(56) References Cited

U.S. PATENT DOCUMENTS

| | | | | |
|---|---|---|---|---|
| 2013/0118669 | A1* | 5/2013 | Krietemeyer | ....... B60C 15/0045 152/552 |
| 2015/0360515 | A1* | 12/2015 | Watanabe | ................. B60C 5/00 152/454 |
| 2016/0200150 | A1* | 7/2016 | Yamamoto | .............. B60C 15/06 152/541 |
| 2019/0047332 | A1* | 2/2019 | Nakajima | ........... B60C 15/0607 |

FOREIGN PATENT DOCUMENTS

| | | |
|---|---|---|
| JP | 2016037088 | 3/2016 |
| JP | 2016-147567 A | 8/2016 |

\* cited by examiner

PNEUMATIC TIRE

TECHNICAL FIELD

The present invention relates to a pneumatic tire.

BACKGROUND ART

Patent Document 1 below discloses a pneumatic tire provided with a carcass, a strip, a filler and an apex. The carcass comprises a carcass ply comprising a main portion located in an axially inside part of the bead, and a turned-up portion located in an axially outside part of the bead. The strip is made of a high-hardness crosslinked rubber and extends radially outward from the apex. The filler is made of a high-hardness crosslinked rubber and is located on the axially outer side of the turned-up portion. Such pneumatic tire is described as having high rigidity and excellent durability.

Patent Document 1: Japanese Patent Application Publication No. 2016-147567

SUMMARY OF THE INVENTION

Problems to be Solved by the Invention

In the bead reinforcing structure disclosed in the Patent Document 1, however, there is a possibility that durability is deteriorated when damage is caused in the vicinity of the radially outer edge of the filler.

It is therefore, an object of the present invention to provide a pneumatic tire of which durability is improved.

According to the present invention, a pneumatic tire comprises: a tread portion; a pair of axially spaced bead portions each with a bead core embedded therein; a pair of sidewall portions extending between tread edges and the bead portions; and a carcass extending between the bead portions through the tread portion and the sidewall portions and comprising a carcass ply,
wherein
the carcass ply is composed of carcass cords rubberized with a topping rubber and extending between the bead portions through the tread portion and the sidewall portions and turned up around the bead core in each of the bead portions from the axially inside to the axially outside of the tire so as to form a pair of carcass-ply turned-up portions and a carcass-ply main portion therebetween,
the bead portions are each provided with
a primary bead apex rubber disposed between the carcass-ply main portion and the carcass-ply turned-up portion and extending radially outwardly from the bead core,
an insulation rubber layer having a radially inner edge located between the primary bead apex rubber and the carcass-ply main portion and extending radially outwardly from the above-said radially inner edge through between the carcass-ply main portion and the carcass-ply turned-up portion, and
a subsidiary bead apex rubber layer disposed axially outside the carcass-ply turned-up portion,
wherein
the subsidiary bead apex rubber layer has a radially outer edge,
the insulation rubber layer has a radially outer edge which is located radially outside the radially outer edge of the subsidiary bead apex rubber layer, and a complex elastic modulus $E^*a$ of the insulation rubber layer is not smaller than a complex elastic coefficient $E^*b$ of the topping rubber of the carcass ply.

It is preferable that the complex elastic modulus $E^*a$ of the insulation rubber layer is smaller than a complex elastic modulus $E^*c$ of the subsidiary bead apex rubber layer.

It is preferable that the radially outer edge of the subsidiary bead apex rubber layer is positioned in a range between a height of 30% and a height of 55% of a cross-sectional height of the tire, each height measured radially outwardly from a bead base line.

It is preferable that the subsidiary bead apex rubber layer has a radially inner edge positioned in a range between a height of 2% and a height of 18% of the cross-sectional height of the tire, each height measured radially outwardly from a bead base line.

It is preferable that the thickness of the subsidiary bead apex rubber layer is in a range from 1.0 to 2.0 mm.

It is preferable that the thickness of the insulation rubber layer is in a range from 0.8 to 2.3 mm.

It is preferable that the radially inner edge of the insulation rubber layer is located radially inside the radially outer edge of the primary bead apex rubber.

It is preferable that the dimension in the tire radial direction of the primary bead apex rubber is in a range from 18 to 23 mm.

The tread portion may be provided with a tread reinforcing belt located radially outside the carcass ply, and the turned-up portion preferably has a radially outer edge sandwiched between the tread reinforcing belt and the carcass-ply main portion.

The carcass may comprise a second carcass ply adjacent to the above-said carcass ply as the first carcass ply.

DESCRIPTION OF THE PREFERRED EMBODIMENTS

The present invention can be applied to various pneumatic tires for a passenger car, a light truck, a heavy duty vehicle and the like.

Hereinafter, taking a pneumatic tire for a light truck as an example, an embodiment of the present invention will be described in detail in conjunction with accompanying drawings.

Figure 1:
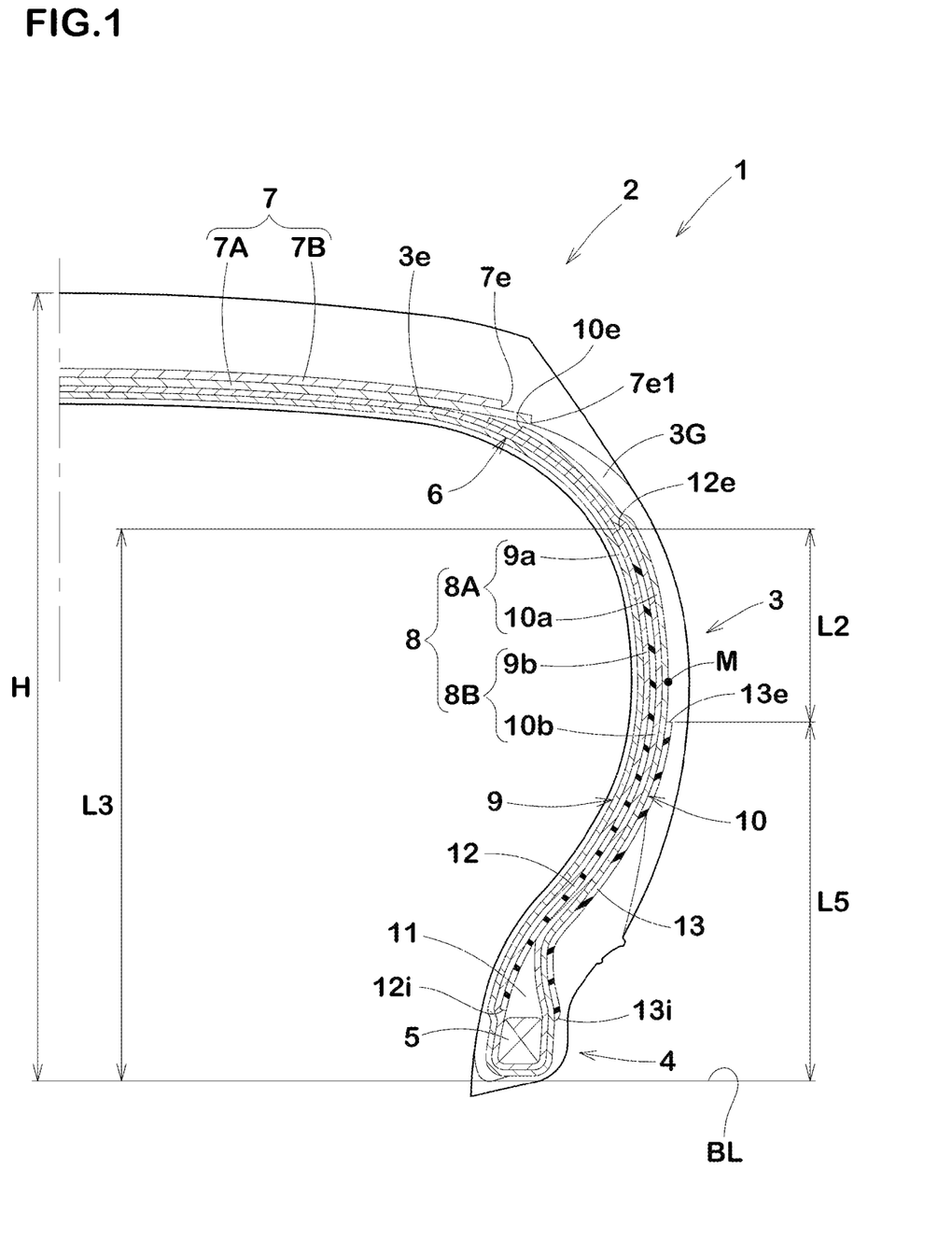
FIG. 1 is a cross-sectional partial view of a pneumatic tire as an embodiment of the present invention taken along a tire meridian plane including the tire rotational axis.

FIG. 1 shows a pneumatic tire 1 as an embodiment of the present invention under its normally inflated unloaded condition.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. For example, the standard wheel rim is the "standard rim" specified in JATMA, the "Measuring Rim" in ETRTO, the "Design Rim" in TRA or the like. The standard pressure is the maximum air pressure for the tire specified together with the maximum tire load by the same organization in the Air-pressure/Maximum-load Table or similar list. For example, the standard pressure is the "maximum air pressure" in JATMA, the "Inflation Pressure" in ETRTO, the maximum pressure given in the "Tire Load Limits at various Cold Inflation Pressures" table in TRA or the like.

The pneumatic tire 1 comprises a tread portion 2, a pair of axially spaced bead portions 4 each with a bead core 5 embedded therein, a pair of sidewall portions 3 extending between tread edges and the bead portions 4, a carcass 6 extending between the bead portions 4, and a tread reinforcing belt 7 disposed radially outside the carcass 6 in the tread portion 2.

In the present embodiment, a sidewall rubber 3G, which is disposed in each of the sidewall portions 3 and forms the outer surface thereof, has a radially outer edge 3e positioned between the belt 7 and the carcass 6. However, the pneumatic tire 1 according to the present invention is not limited to such sidewall structure.

Figure 2:
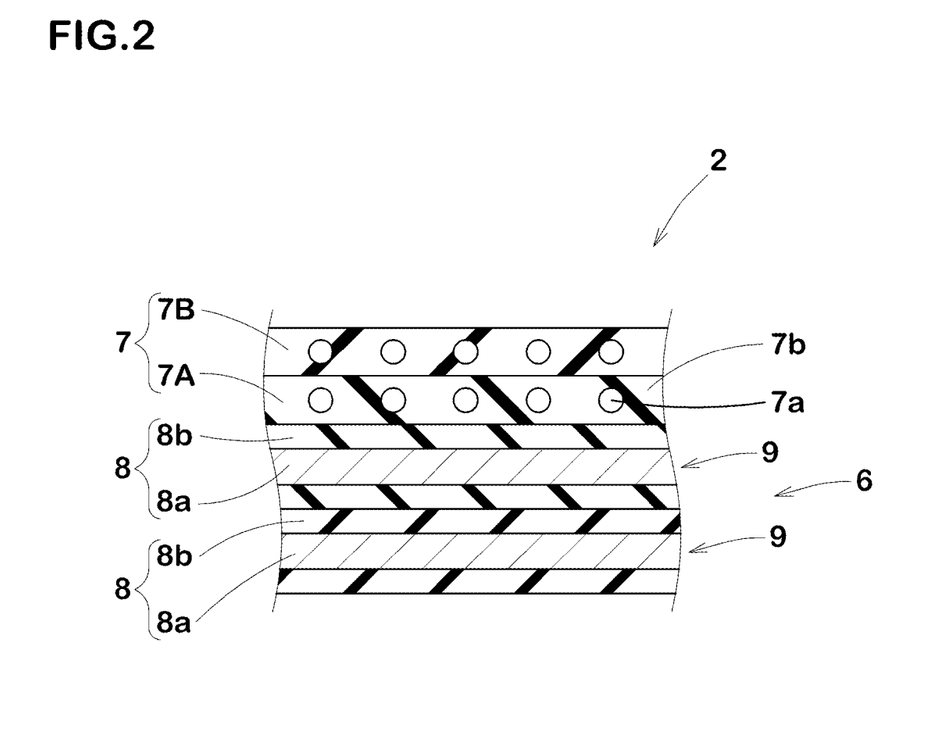
FIG. 2 is a schematic cross-sectional view showing a carcass composed of two carcass plies, and a tread reinforcing belt thereon composed of two belt plies.

FIG. 2 is a schematic cross-sectional partial view of the tread portion 2.

The carcass 6 is composed of at least one carcass ply 8 of carcass cords 8a rubberized with a topping rubber 8b. In the carcass ply 8 in this example, the carcass cords 8a are arranged radially at an angle of 70 to 90 degrees with respect to the tire circumferential direction.

The carcass ply 8 extends between the bead portions 4 through the tread portion 2 and the sidewall portions 3, and is turned up around the bead core 5 in each bead portion 4 from the axially inside to the axially outside so as to form a pair of carcass-ply turned-up portions 10 and a carcass-ply main portion 9 therebetween as shown in FIG. 1.

At least one of, in the present embodiment, each of the bead portions 4 is provided with a primary bead apex rubber 11, an insulation rubber layer 12, and a subsidiary bead apex rubber layer 13.

The primary bead apex rubber 11 extends radially outwardly from the bead core 5 through between the carcass-ply turned-up portion 10 and the carcass-ply main portion 9.

The insulation rubber layer 12 extends radially outwardly from its radially inner edge 12i located between the primary bead apex rubber 11 and the carcass-ply main portion 9 through between the carcass-ply main portion 9 and the carcass-ply turned-up portion 10.

The subsidiary bead apex rubber layer 13 is disposed on the axially outside of the carcass-ply turned-up portion 10.

Since the radially outer edge 12e of the insulation rubber layer 12 is located radially outside the radially outer edge 13e of the subsidiary bead apex rubber layer 13, the change in rigidity occurring between the radially inner side and the radially outer side of the radially outer edge 13e of the subsidiary bead apex rubber layer 13 becomes small. As a result, the strain occurring in the vicinity of the radially outer edge 13e of the subsidiary bead apex rubber layer 13 during running, is dispersed, and trouble such as carcass ply loose is suppressed, and the durability can be improved.

The complex elastic modulus E*a of the insulation rubber layer 12 is not smaller than, preferably more than the complex elastic modulus E*b of the topping rubber 8b. As a result, it is possible to further suppress the above-mentioned change in the rigidity, so it is possible to further improve the durability. Further, at the time of building the raw tire, local deformation of the subsidiary bead apex rubber layer 13 occurring in the vicinity of the radially outer edge 13e of the subsidiary bead apex rubber layer 13 can be suppressed, which can suppress trapped air, therefore, defects in the tire appearance can be suppressed.

The complex elastic modulus E* is measured under the following measurement conditions in accordance with the Japanese Industrial standard (JIS) "K6394":

initial strain: 10%
amplitude: +/−1.0%
frequency: 10 Hz
temperature: 30 degrees C.

For example, a viscoelastic spectrometer (trade name "VESF-3" manufactured by Iwamoto Seisakusho Co., Ltd.) can be used by being set at the tensile deformation mode.

In the present embodiment, the belt 7 is composed of a radially inner belt ply 7A and a radially outer belt ply 7B which is narrower than the inner belt ply 7A. Accordingly, the axial edges of the radially inner belt ply 7A are respectively positioned axially outside the axial edges of the radially outer belt ply 7B.

In the present embodiment, each of the belt plies 7A and 7B is composed of high modulus belt cords 7a such as steel cords laid at an angle in a range from 15 to 40 degrees with respect to the tire equator C, and a topping rubber 7b covering the belt cords 7a as shown in FIG. 2.

The radially outer edge 10e of the carcass-ply turned-up portion 10 is sandwiched between the carcass-ply main portion 9 and the belt 7 in the present embodiment.

Such turned-up portion 10 increases the rigidity of the sidewall portion 3 and is useful for reducing a stepped change in the rigidity caused at the radially outer edge 10e.

In this example, the radially outer edge 10e of the carcass-ply turned-up portion 10 is sandwiched between the carcass-ply main portion 9 and the radially inner belt ply 7A.

Here, the expression "sandwiched between the carcass-ply main portion 9 and the belt 7" means that the radially outer edge 10e is positioned axially inside the adjacent axial edge 7e of the belt 7 which edge is, in this example, the adjacent axial edge 7e1 of the radially inner belt ply 7A since the radially inner belt ply 7A is widest.

In the present embodiment, the carcass 6 is composed of two carcass plies 8, namely, a first ply 8A and a second ply 8B which is positioned on the radially outside of the first ply 8A in the tread portion.

The first ply 8A has the carcass-ply main portion 9a and the carcass-ply turned-up portions 10a.

The second ply 8B has the carcass-ply main portion 9b and the carcass-ply turned-up portions 10b.

The radially outer edges of the carcass-ply turned-up portions 10a and 10b of the carcass plies 8A and 8B are terminated between the belt 7 and the carcass-ply main portions 9 (9a, 9b). The carcass 6 is however, not limited to such structure, and may composed of only one carcass ply 8, for example.

Figure 3:
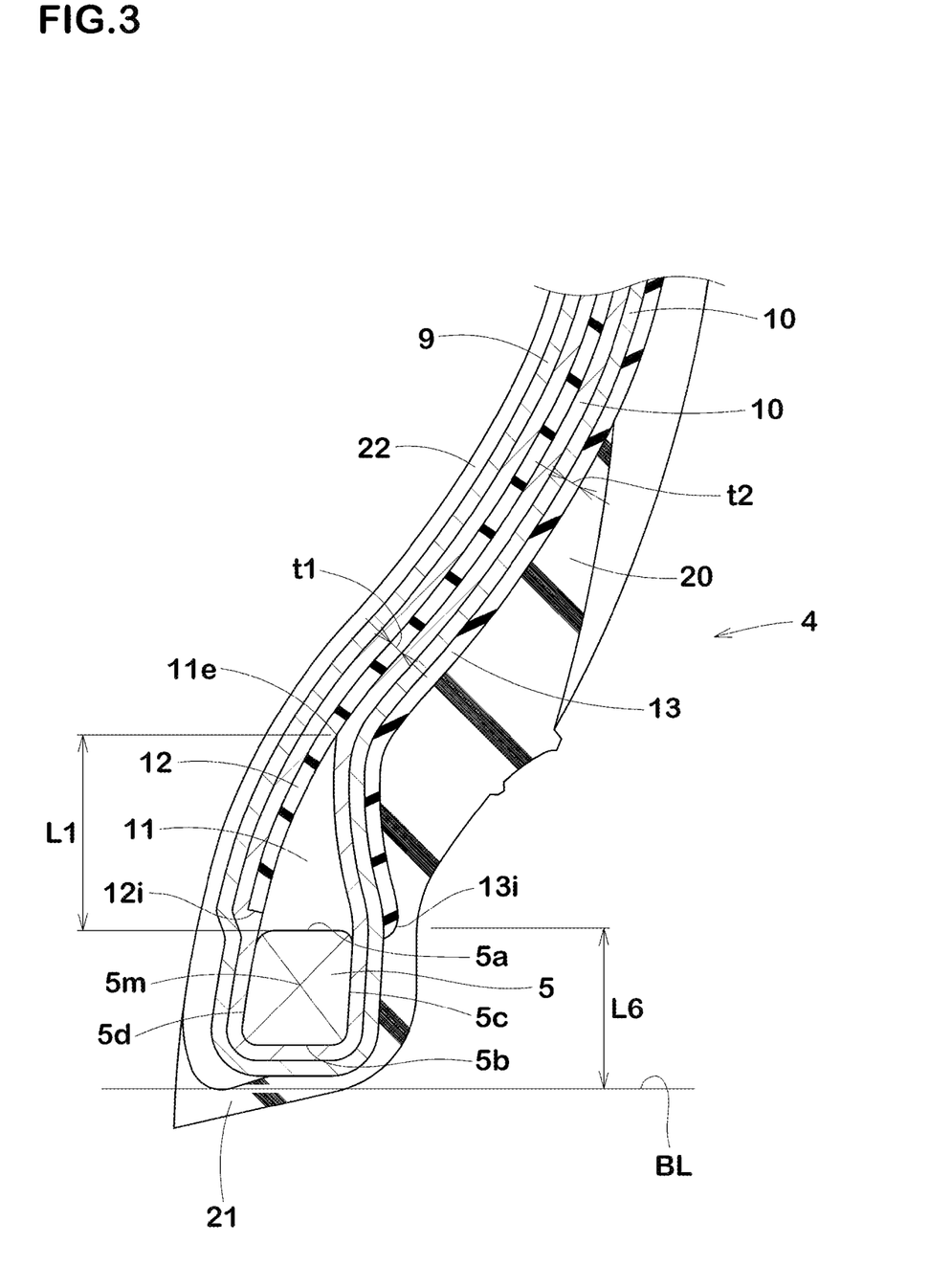
FIG. 3 is an enlarged cross-sectional view of the bead portion of the pneumatic tire shown in FIG. 1.

As shown in FIG. 3, the bead core 5 in this example has a substantially rectangular cross sectional shape, having a radially outer surface 5a, a radially inner surface 5b, an axially outer surface 5c, and an axially inner surface 5d. The bead core 5 is however, not limited to such cross sectional shape.

The primary bead apex rubber 11 is made of a rubber compound having a complex elastic modulus E*1 which is larger than the complex elastic modulus E*b of the carcass ply topping rubber 8b. The complex elastic modulus E*1 is preferably not less than 10 MPa, more preferably not less than 15 MPa, but preferably not more than 50 MPa, more preferably not more than 45 MPa. Such primary bead apex rubber 11 increases the rigidity of the bead portion 4 and helps to improve the steering stability performance.

In this embodiment, the primary bead apex rubber 11 extends radially outwardly from the radially outer surface 5a of the bead core 5, tapering toward its radially outer edge 11e. Thus, the primary bead apex rubber 11 in this example has a substantially triangular cross sectional shape.

As shown in FIG. 3, the radial dimension L1 of the primary bead apex rubber 11 is set in a range from 18 to 23 mm, for example. By setting the radial dimension L1 to 18 mm or more, the rigidity of the bead portion 4 can be maintained high. By setting the radial dimension L1 to 23 mm or less, the carcass-ply turned-up portion 10 which extends radially outwardly from the bead core 5 can be curved axially inwardly, and thereby, the compression strain acting on the carcass-ply turned-up portion 10 can be reduced.

If the complex elastic modulus E*a of the insulation rubber layer 12 is excessively larger than the complex elastic modulus E*b of the topping rubber 8b, then a stepped change in the rigidity caused in the vicinity of the radially outer edge 12e of the insulation rubber layer 12 becomes large, and the durability may be rather deteriorated. Therefore, the difference (E*a−E*b) between the complex elastic modulus E*a and the complex elastic modulus E*b is preferably set to be not more than 20 MPa, more preferably not more than 10 MPa, still more preferably not more than 5 MPa.

The complex elastic modulus E*a of the insulation rubber layer 12 is preferably not less than 2 MPa, more preferably not less than 4 MPa, but preferably not more than 20 MPa, more preferably not more than 10 MPa.

The complex elastic modulus E*b of the topping rubber 8b is preferably not less than 2 MPa, more preferably not less than 4 MPa, but preferably not more than 15 MPa, more preferably not more than 8 MPa.

It is preferable that the complex elastic modulus E*a of the insulation rubber layer 12 is smaller than the complex elastic modulus E*c of the subsidiary bead apex rubber layer 13. If the complex elastic modulus E*a of the insulation rubber layer 12 is larger than the complex elastic modulus E*c of the subsidiary bead apex rubber layer 13, the difference in the rigidity between the inside and outside in the tire radial direction of the radially outer edge 12e of the insulation rubber layer 12 is increased, and there is a possibility that the durability is deteriorated.

In the present embodiment, the difference (E*c−E*a) between the complex elastic modulus E*c of the subsidiary bead apex rubber layer 13 and the complex elastic modulus E*a of the insulation rubber layer 12 is set to be not less than 4 MPa, more preferably not less than 8 MPa.

It is preferable that, as shown in FIG. 1, the radially outer edge 12e of the insulation rubber layer 12 is positioned radially outside the radially outer edge 13e of the subsidiary bead apex rubber layer 13, and the radial distance L2 between the radially outer edge 12e and the radially outer edge 13e of the subsidiary bead apex rubber layer 13 is set to be not less than 30% of the cross-sectional height H of the tire 1. As a result, the effect of reducing the rigidity change at the radially outer edge 13e of the subsidiary bead apex rubber layer 13 can be effectively enhanced, and at the same time, the steering stability performance of the tire 1 can be improved. If the radially outer edge 12e of the insulation rubber layer 12 is farther outward than the radially outer edge 13e of the subsidiary bead apex rubber layer 13 in the radial direction of the tire, the mass of the tire 1 is increased, and the rolling resistance of the tire may be deteriorate.

Thus, preferably, the radial distance L2 is set to be not more than 55%, more preferably not more than 50% of the cross-sectional height H of the tire 1, Preferably, the radial distance L3 of the radially outer edge 12e of the insulation rubber layer 12 from the bead base line BL is set to be not more than 90%, more preferably not more than 85%, but preferably not less than 70%, more preferably not less than 75% of the cross-sectional height H of the tire 1, In the present embodiment, as shown in FIG. 3, the radially inner edge 12i of the insulation rubber layer 12 is positioned radially inside the radially outer edge 11e of the primary bead apex rubber 11 so that the insulation rubber layer 12 overlaps with the primary bead apex rubber 11.

As a result, the rigidity in the vicinity of the radially inner edge 12i of the insulation rubber layer 12 is increased, and the steering stability performance may be further improved.

In the present embodiment, the radially inner edge 12i of the insulation rubber layer 12 is located radially outside the radially outer surface 5a of the bead core 5. In the present embodiment, the radially inner edge 12i of the insulation rubber layer 12 is located radially outside the radially inner edge 13i of the subsidiary bead apex rubber layer 13. However, the radially inner edge 12i of the insulation rubber layer 12 may be located radially inside the radially inner surface Sb of the bead core 5.

The thickness t1 of the insulation rubber layer 12 in this example is in a range from 0.8 to 2.3 mm. Since the thickness t1 of the insulation rubber layer 12 is 0.8 mm or more, the variation of the rigidity that occurs at the radially outer edge 13e of the subsidiary bead apex rubber layer 13 can be reduced. Since the thickness t1 of the insulation rubber layer 12 is 2.3 mm or less, an increase in the mass of the tire 1 can be suppressed.

Here, the thickness t1 means the maximum thickness.

The insulation rubber layer 12 may be made of the same rubber compound as the topping rubber 8b of the carcass ply 8 so that the insulation rubber layer 12 has a high bonding strength with the carcass 6 and can suppress carcass ply loose.

It is preferable that the complex elastic modulus E*c of the subsidiary bead apex rubber layer 13 is set to be not less than 10 MPa, more preferably not less than 15 MPa in order to maintain the rigidity of the bead portion 4 at high, but the complex elastic modulus E*c is preferably set to be not more than 50 MPa, more preferably not more than 45 MPa. In the present embodiment, the complex elastic modulus E*c of the subsidiary bead apex rubber layer 13 is the same as the complex elastic modulus E*1 of the primary bead apex rubber 11. It is preferable that the subsidiary bead apex rubber layer 13 is made of the same rubber compound as the primary bead apex rubber 11.

It is preferable that, as shown in FIG. 1, the radially outer edge 13e of the subsidiary bead apex rubber layer 13 is located at a radial distance L5 within a range between 30% and 55% of the cross-sectional height H of the tire 1 from the bead base line BL.

Preferably, the radial distance L5 is not more than 50%, more preferably not more than 45% of the cross-sectional height H of the tire 1.

Since the radially outer edge 13e is located at the radial distance L5 of 30% or more of the tire cross-sectional height H from the bead base line BL, the rigidity of the bead portion 4 can be increased, and the durability and steering stability performance of the tire can be maintained high.

Since the radially outer edge 13e is located at the radial distance L5 of 55% or less of the tire cross-sectional height H from the bead base line BL, a defect due to bare occurring in tire shoulders during tire vulcanization molding is suppressed, and deterioration of the tire appearance can be prevented.

Incidentally, the "bead base line BL" is a straight line extending parallel to the tire axial direction, passing through a radial position corresponding to the rim diameter of the standard rim for the tire 1.

It is preferable that the radially outer edge 13e of the subsidiary bead apex rubber layer 13 is located radially inside the maximum tire cross-sectional width position M, for example for the tire appearance.

The maximum tire cross-sectional width position M may be defined by the maximum cross-sectional width position of the carcass 6.

It is preferable that, as shown in FIG. 3, the radially inner edge 13i of the subsidiary bead apex rubber layer 13 is located at a radial distance L6 in a range between 2% and 18% of the cross-sectional height H of the tire 1 from the bead base line BL. The radial distance L6 is preferably not less than 5%, and preferably not more than 15% of the tire cross-sectional height H.

Since the radially inner edge 13i is located at the radial distance L6 of 2% or more of the tire cross-sectional height H, it is possible to improve the rolling resistance of the tire. Since the radially inner edge 13i is located at the radial distance L6 of 18% or less of the tire cross-sectional height H, the rigidity of the bead portion 4 is increased, and the durability and steering stability performance of the tire can be improved.

In the present embodiment, the radially inner edge 13i of the subsidiary bead apex rubber layer 13 is located radially inside the radial outer surface 5a of the bead core 5, so the durability of the bead portion 4 is enhanced.

In the present embodiment, the radially inner edge 13i of the subsidiary bead apex rubber layer 13 is located radially outside the centroid Sm of the cross section of the bead core 5.

If the radially inner edge 13i of the subsidiary bead apex rubber layer 13 is located radially outside the radially outer surface 5a of the bead core 5, the increase in the mass of the tire 1 is suppressed.

Preferably, the thickness t2 of the subsidiary bead apex rubber layer 13 is set in a range from 1.0 to 2.0 mm. As a result, the rolling resistance, durability, and steering stability performance can be improved in a well-balanced manner. The thickness t2 means the maximum thickness.

The bead portions 4 are each provided with a clinch rubber layer 20, a chafer rubber layer 21, and an inner liner 22. The clinch rubber layer 20 is disposed on the axially outside of the subsidiary bead apex rubber layer 13 in this example.

The chafer rubber layer 21 is continued from the clinch rubber layer 20 and disposed on the radially inside of the carcass-ply turned-up portion 10 in this example.

The clinch rubber layer 20 and the chafer rubber layer 21 are arranged to come into contact with the flange and bead seat of the wheel rim (not shown).

The inner liner 22 is disposed along the inside of the carcass 6, and extends between the bead portions.

The clinch rubber layer 20, the chafer rubber layer 21, and the inner liner 22 may be made of well-known rubber compounds.

Figure 4A:
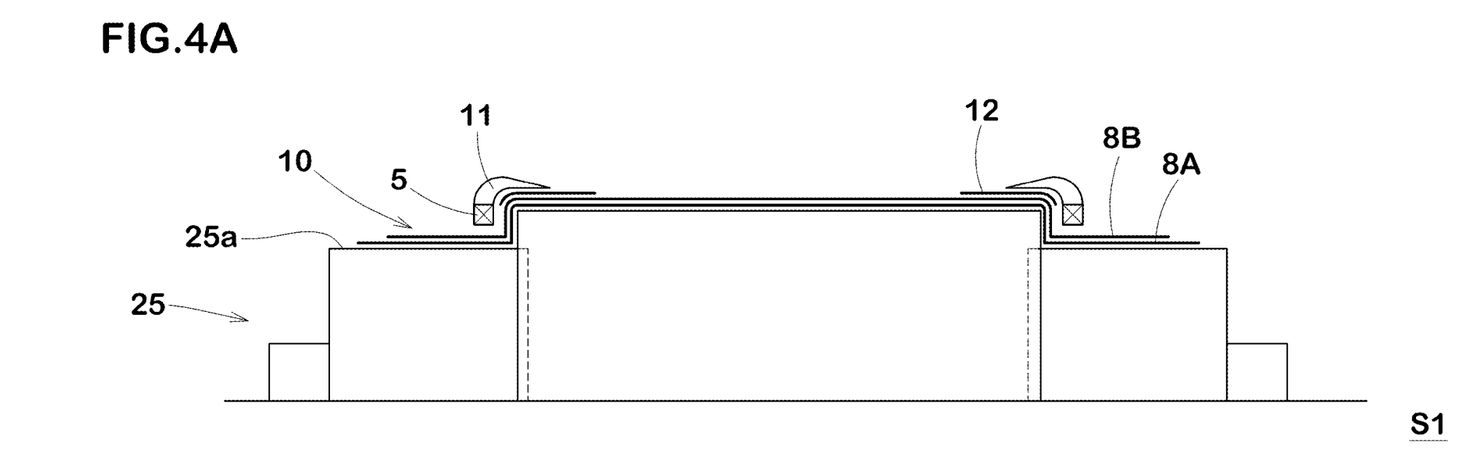
FIG. 4A and FIG. 4B are schematic cross-sectional views for explaining a method for manufacturing the pneumatic tire.
Figure 4B:
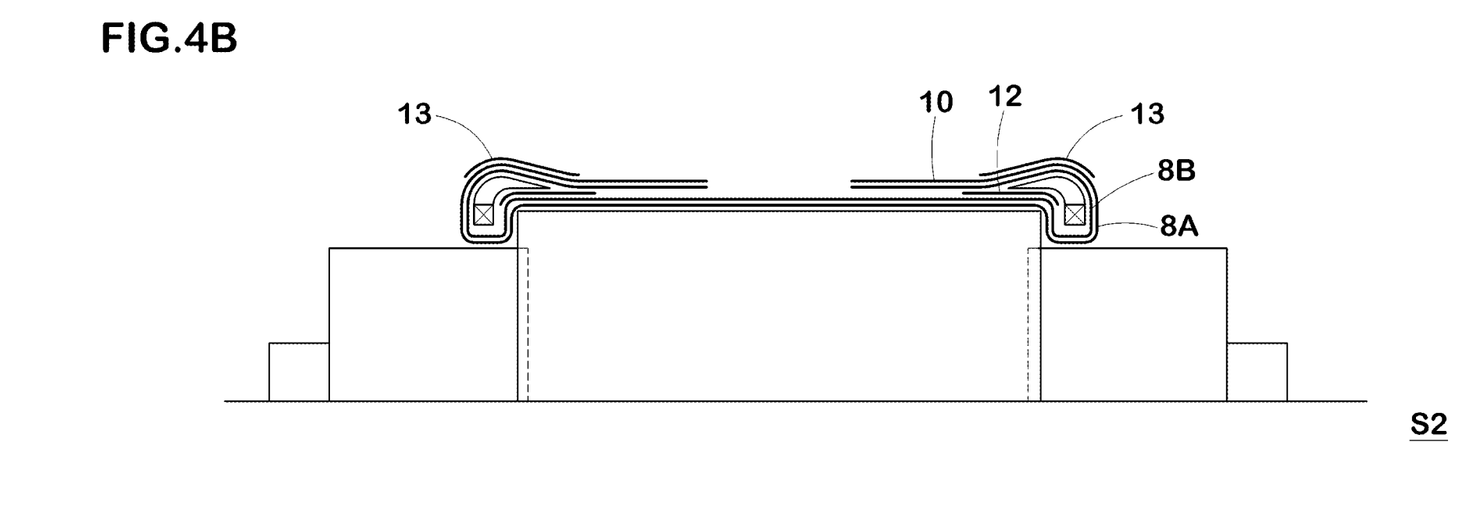

FIGS. 4A and 4B are schematic cross-sectional views for explaining a method of manufacturing the pneumatic tire 1. The manufacturing method in the present embodiment comprises a step S1 shown in FIG. 4A and a step S2 shown in FIG. 4B.

In the step S1 shown in FIG. 4A, on the outer surface 25a of a tire building drum 25, the inner liner 22 and the first and second carcass plies 8A and 8B are wound. Then, the bead core 5 and the primary bead apex rubber 11 are set on these wound materials on each side thereof in the tire axial direction, and the insulation rubber layer 12 in the form of a strip having a uniform thickness is wound on the axially inside of each assembly of the bead core and primary bead apex rubber. Thereafter, the primary bead apex rubber 11 is folded on the wound insulation rubber layer 12.

In the step S2 shown in FIG. 4B, each edge portion 10 in the tire axial direction of the carcass (formed by plies 8A and 8B) is folded over the insulation rubber layer 12 and the primary bead apex rubber, and then the subsidiary bead apex rubber layer 13 in the form of a strip having a uniform thickness is wound on the outside of each edge portion 10 folded. Thereafter, the cylindrical assembly built on the drum is shaped into a toroidal shape, and various tire components are applied thereto to form a raw tire, then the raw tire is vulcanized in a mold to form the pneumatic tire 1.

While detailed description has been made of a preferable embodiment of the present invention, the present invention can be embodied in various forms without being limited to the illustrated embodiment.

Comparison Tests

Based on the internal structure shown in FIG. 1, pneumatic tires of size 205/85R16 (rim size 18×5.0 J) for light trucks were experimentally manufactured as test tires (working example tires Ex.1-Ex.10 and comparative example tires Ref.1 and Ref.2) and tested for the durability, steering stability performance, rolling resistance, and appearance.

Specifications of the test tires are shown in Table 1, wherein as to the position of the radially inner edge of the insulation rubber layer, "A" means that it was located radially inside the radially outer edge of the primary bead apex rubber, and "B" means that it was located radially outside the radially outer edge of the primary bead apex rubber.

Common specifications are as follows:
thickness t2 of subsidiary bead apex rubber layer: 0.8 mm
complex elastic modulus E*c of subsidiary bead apex rubber layer: 30 MPa <Durability Test>

Using a tire drum tester, each test tire mounted on a standard wheel rim and inflated to 290 kPa, was run under a tire load of 8.94 kN at a speed of 100 km/h, and a runnable distance until damage was occurred was measured.

The results are shown in Table 1 by an index based on Comparative Example tire Ref.1 being 100, wherein the larger the number, the better the durability.

<Steering Stability Test>

The test tires were mounted on all wheels of a test car (1800 cc passenger car) and inflated to 260 KPa. Then, the test driver evaluated the steering stability performance based on responsiveness, rigidity, road grip, stability and transient characteristics during running the test car on a dry asphalt road of a circuit test course at 40-100 Km/h.

The results are indicated in Table 1 by an index based on Comparative Example tire Ref.1 being 100, wherein the larger the number, the better the steering stability.

<Rolling Resistance Test>

Using a tire rolling resistance tester, the rolling resistance of the test tire was measured under the following conditions.
tire pressure: 260 kPa
tire load: 5.26 kN
running speed: 80 km/h The results are indicated in Table 1 by an index based on Comparative Example tire Ref.1 being 100, wherein the smaller the number, the better the rolling resistance.

<Appearance Test>

The appearance of the sidewall portion of the test tire was evaluated visually by a tester.

The results were indicated in Table 1 by an index based on Comparative Example tire Ref.1 being 100, wherein the larger the value, the less the defect, namely, the better the appearance.

TABLE 1

| Tire | Ref. 1 | Ref. 2 | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|
| subsidiary bead apex rubber layer outer edge L5/H (%) | 60 | 40 | 40 | 55 | 56 | 30 | 40 | 40 | 40 | 40 | 40 | 40 |
| insulation rubber layer outer edge L3/H (%) | 60 | 85 | 85 | 70 | 70 | 85 | 85 | 85 | 85 | 85 | 85 | 85 |
| insulation rubber E*a (MPa) | 4.8 | 3.5 | 4.8 | 4.8 | 4.8 | 4.8 | 24 | 9.0 | 4.8 | 4.8 | 4.8 | 4.8 |
| topping rubber E*b (MPa) | 4.5 | 4.8 | 4.5 | 4.5 | 4.5 | 4.5 | 4.8 | 4.5 | 4.5 | 4.5 | 4.5 | 4.5 |
| subsidiary bead apex rubber layer inner edge L6/H (%) | 10 | 10 | 10 | 10 | 10 | 10 | 10 | 10 | 25 | 18 | 10 | 10 |
| insulation rubber layer inner edge position | A | A | A | A | A | A | A | A | A | A | B | A |
| insulation rubber layer thickness t1 (mm) | 1.5 | 1.5 | 1.5 | 1.5 | 1.5 | 1.5 | 1.5 | 1.5 | 1.5 | 1.5 | 1.5 | 0.5 |
| durability | 100 | 100 | 110 | 110 | 110 | 110 | 102 | 105 | 110 | 110 | 110 | 108 |
| steering stability | 100 | 100 | 108 | 105 | 105 | 103 | 114 | 113 | 103 | 108 | 108 | 105 |
| rolling resistance | 100 | 100 | 100 | 100 | 100 | 97 | 95 | 98 | 100 | 100 | 102 | 98 |
| appearance | 100 | 100 | 110 | 110 | 105 | 110 | 105 | 108 | 104 | 110 | 110 | 105 |

From the test results, it was confirmed that the working example tires according to the present invention were improved in the durability and appearance as compared with the comparative example tires.

DESCRIPTION OF THE REFERENCE SIGNS

1: pneumatic tire
4: bead portion
5: bead core
6: carcass
8: carcass ply
8b: topping rubber
9: carcass-ply main portion
10: carcass-ply turned-up portion
11: primary bead apex rubber
12: insulation rubber layer
12e: radially outer edge of insulation rubber layer
13: subsidiary bead apex rubber layer
13e: radially outer edge of subsidiary bead apex rubber layer

The invention claimed is:

1. A pneumatic tire comprising:
a tread portion;
a pair of axially spaced bead portions each with a bead core embedded therein;
a pair of sidewall portions extending between tread edges and the bead portions; and
a carcass extending between the bead portions through the tread portion and the sidewall portions; and
a tread reinforcing belt disposed radially outside the carcass in the tread portion,
wherein
the carcass comprises two carcass plies each composed of carcass cords rubberized with a topping rubber and extending between the bead portions through the tread portion and the sidewall portions and turned up around the bead core in each of the bead portions from the axially inside to the axially outside of the tire so as to form a pair of carcass-ply turned-up portions and a carcass-ply main portion therebetween,
the carcass-ply turned-up portions of the two carcass plies are extended into the tread portion so that radially outer edges thereof are secured radially inside the tread reinforcing belt,
the bead portions are each provided with
a primary bead apex rubber disposed between an axially outer one of the carcass-ply main portions and an axially inner one of the carcass-ply turned-up portions and extending radially outwardly from the bead core,
an insulation rubber layer having a radially inner edge located between the primary bead apex rubber and the axially outer one of the carcass-ply main portions and extending radially outwardly from said radially inner edge through between the axially outer one of the carcass-ply main portions and the axially inner one of the carcass-ply turned-up portions, and
a subsidiary bead apex rubber layer disposed axially outside the axially outer one of the carcass-ply turned-up portions,
wherein
the subsidiary bead apex rubber layer has a radially outer edge and a radially inner edge, and is disposed in direct contact with the axially outer one of the carcass-ply turned-up portions from the radially outer edge to the radially inner edge of the subsidiary bead apex rubber layer,
the subsidiary bead apex rubber layer has a substantially constant thickness from 1.0 to 2.0 mm,
the insulation rubber layer has a radially outer edge which is located radially outside the radially outer edge of the subsidiary bead apex rubber layer,
a radial distance L3 of the radially outer edge of the insulation rubber layer from a bead base line is not more than 90% and not less than 75% of a cross-sectional height of the tire, and
wherein
a complex elastic modulus $E^*a$ of the insulation rubber layer is not smaller than a complex elastic coefficient $E^*b$ of the topping rubber of the carcass ply.

2. The pneumatic tire according to claim 1, wherein
the thickness of the insulation rubber layer is in a range from 0.8 to 2.3 mm.

3. The pneumatic tire according to claim 1, wherein
the radially inner edge of the insulation rubber layer is located radially inside the radially outer edge of the primary bead apex rubber.

4. The pneumatic tire according to claim 1, wherein
the subsidiary bead apex rubber layer has a radially inner edge positioned in a range between a height of 2% and a height of 18% of the cross-sectional height of the tire, each height measured radially outwardly from the bead base line.

5. The pneumatic tire according to claim 4, wherein
the thickness of the insulation rubber layer is in a range from 0.8 to 2.3 mm.

6. The pneumatic tire according to claim 1, wherein
the radially outer edge of the subsidiary bead apex rubber layer is positioned in a range between a height of 30% and a height of 55% of the cross-sectional height of the tire, each height measured radially outwardly from the bead base line.

7. The pneumatic tire according to claim 6, wherein
the subsidiary bead apex rubber layer has a radially inner edge positioned in a range between a height of 2% and a height of 18% of the cross-sectional height of the tire, each height measured radially outwardly from the bead base line.

8. The pneumatic tire according to claim 6, wherein
the thickness of the insulation rubber layer is in a range from 0.8 to 2.3 mm.

9. The pneumatic tire according to claim 1, wherein
the complex elastic modulus $E^*a$ of the insulation rubber layer is smaller than a complex elastic modulus $E^*c$ of the subsidiary bead apex rubber layer.

10. The pneumatic tire according to claim 9, wherein
the subsidiary bead apex rubber layer has a radially inner edge positioned in a range between a height of 2% and a height of 18% of the cross-sectional height of the tire, each height measured radially outwardly from the bead base line.

11. The pneumatic tire according to claim 9, wherein
the thickness of the insulation rubber layer is in a range from 0.8 to 2.3 mm.

12. The pneumatic tire according to claim 9, wherein
the radially outer edge of the subsidiary bead apex rubber layer is positioned in a range between a height of 30% and a height of 55% of the cross-sectional height of the tire, each height measured radially outwardly from the bead base line.

13. The pneumatic tire according to claim 12, wherein
the subsidiary bead apex rubber layer has a radially inner edge positioned in a range between a height of 2% and a height of 18% of the cross-sectional height of the tire, each height measured radially outwardly from the bead base line.

14. The pneumatic tire according to claim 1, wherein
a dimension in a tire radial direction of said primary bead apex rubber is in a range from 18 to 23 mm, and
the radially outer edge of said subsidiary bead apex rubber layer is located at a radial distance L5 from the bead base line which is in a range from 30% to 55% of the cross-sectional height of the tire, and
the radially inner edge of said subsidiary bead apex rubber layer is located at a radial distance L6 from the bead base line which is in a range from 2% to 18% of the cross-sectional height of the tire.

15. The pneumatic tire according to claim 14, wherein
a radial distance L2 between the radially outer edge of the insulation rubber layer and the radially outer edge of the subsidiary bead apex rubber layer is not less than 30% of the cross-sectional height of the tire.

16. The pneumatic tire according to claim 14, wherein
a complex elastic modulus $E^*1$ of the primary bead apex rubber is not less than 10 MPa and not more than 50 MPa,
a complex elastic modulus $E^*c$ of the subsidiary bead apex rubber layer is not less than 10 MPa and not more than 50 MPa,
the complex elastic modulus $E^*a$ of the insulation rubber layer is not less than 2 MPa and not more than 20 MPa,
a complex elastic modulus $E^*b$ of the carcass ply topping rubber is not less than 2 MPa and not more than 15 MPa,
the complex elastic modulus $E^*1$ is larger than the complex elastic modulus $E^*b$, and
the complex elastic modulus $E^*c$ is larger than the complex elastic modulus $E^*a$.

17. The pneumatic tire according to claim 16, wherein
a difference $E^*a-E^*b$ is equal to or smaller than 20 MPa,
a difference $E^*c-E^*a$ is equal to or larger than 4 MPa.

18. The pneumatic tire according to claim 17, wherein
the complex elastic modulus $E^*c$ is equal to the complex elastic modulus $E^*1$.

19. The pneumatic tire according to claim 18, wherein
the insulation rubber layer has a substantially constant thickness from 0.8 to 2.3 mm.

* * * * *